US006293294B1

United States Patent
Loeb et al.

(10) Patent No.: US 6,293,294 B1
(45) Date of Patent: Sep. 25, 2001

(54) METHOD AND APPARATUS FOR FLUID MIXING AND DISPENSING

(75) Inventors: Robert D. Loeb, Vista; David M. Giuntoli, San Diego; Hugh O. Williams, Oceanside, all of CA (US)

(73) Assignee: Hydrosurge, Inc., San Diego, CA (US)

( * ) Notice: Subject to any disclaimer, the term of this patent is extended or adjusted under 35 U.S.C. 154(b) by 0 days.

(21) Appl. No.: 09/339,770

(22) Filed: Jun. 24, 1999

(51) Int. Cl.[7] .................................................. G05D 11/03
(52) U.S. Cl. .............................. 137/1; 137/889; 137/891; 137/892
(58) Field of Search .................................. 137/889, 892, 137/891, 1

(56) References Cited

U.S. PATENT DOCUMENTS

| 2,719,704 | * | 10/1955 | Anderson et al. ............... 137/889 X |
| 2,800,313 | * | 7/1957 | Targosh et al. . |
| 3,727,640 | * | 4/1973 | Sargeant . |
| 3,728,129 | * | 4/1973 | Sargeant . |
| 3,822,217 | * | 7/1974 | Rodgers . |
| 3,853,784 | * | 12/1974 | Rogers . |
| 3,960,175 | * | 6/1976 | Liepe et al. ....................... 137/889 X |
| 4,103,876 | * | 8/1978 | Hasselman, Jr. et al. . |
| 4,147,657 | | 4/1979 | Kovanda et al. . |
| 4,314,671 | * | 2/1982 | Briar . |
| 5,054,688 | * | 10/1991 | Grindley . |
| 5,055,008 | * | 10/1991 | Daniels et al. . |
| 5,234,322 | * | 8/1993 | Daniels et al. . |
| 5,518,020 | * | 5/1996 | Nowicki et al. . |
| 5,678,593 | | 10/1997 | Lockhart . |
| 5,799,831 | * | 9/1998 | Springgs et al. ................. 137/895 X |

FOREIGN PATENT DOCUMENTS

| 2 766 108 | | 7/1997 | (FR) . |
| 758054 | * | 9/1956 | (GB) . |
| WO 85/01888 | | 5/1985 | (WO) . |

* cited by examiner

*Primary Examiner*—Stephen M. Hepperle
(74) *Attorney, Agent, or Firm*—Brown, Martin, Haller & McClain LLP

(57) ABSTRACT

A fluid mixing device has an inlet passageway for connection to a primary fluid supply, an outlet passageway; and at least two separate venturi passageways each connected between the inlet and outlet passageways. Each venturi passageway has a throat portion, a first venturi inlet connected to the throat portion of the first venturi passageway and a second venturi inlet connected to the throat portion of the second venturi passageway. The first and second venturi inlets are connected to supplies of two different secondary fluids for mixing into the primary fluid, a first one of the secondary fluids being of lower viscosity than the second. The outlet passageway is spaced a predetermined distance downstream of the venturi inlets to prevent substantial backflow of the first secondary fluid mixture into the second venturi passageway prior to mixing together of the two streams in the outlet passageway.

37 Claims, 5 Drawing Sheets

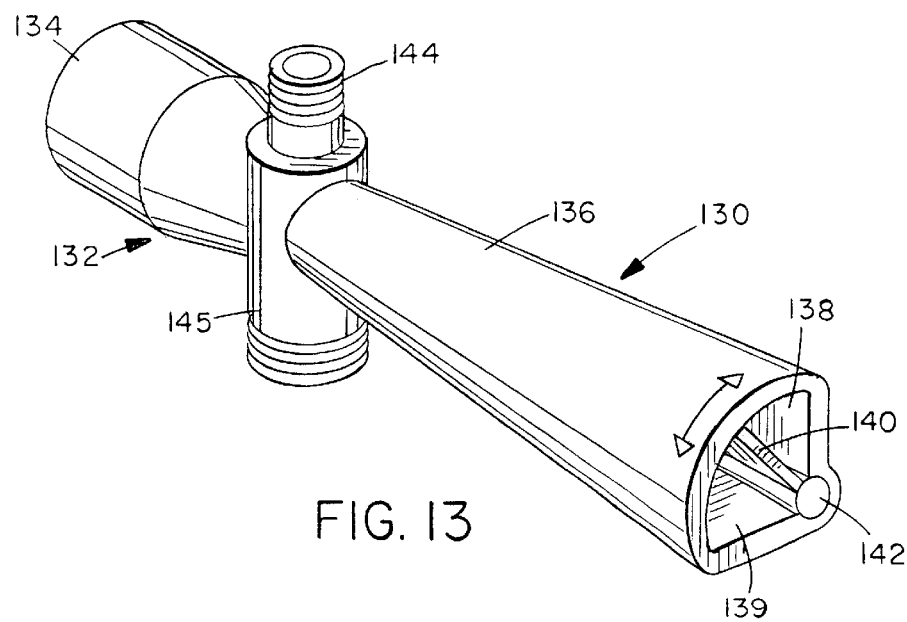
FIG. 13
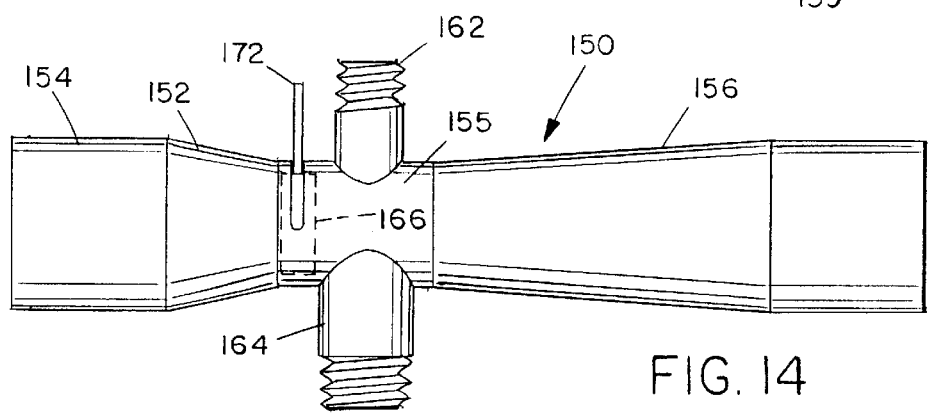
FIG. 14
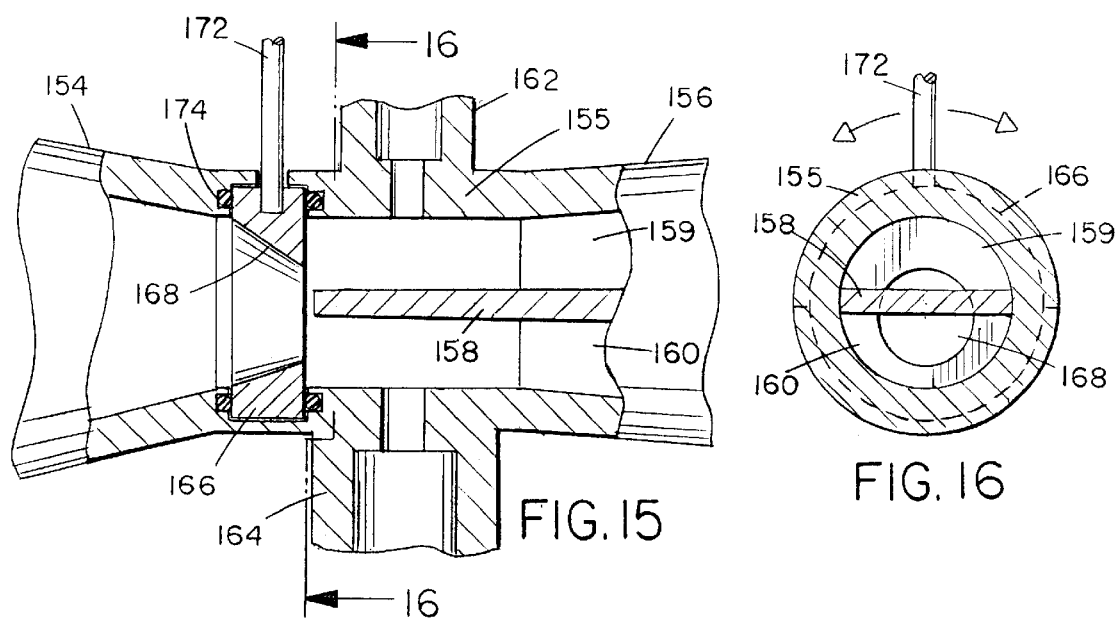
FIG. 15
FIG. 16

METHOD AND APPARATUS FOR FLUID MIXING AND DISPENSING

BACKGROUND OF THE INVENTION

The present invention relates generally to apparatus and methods for mixing and dispensing fluids, and is particularly concerned with an apparatus and method for mixing fluids of differing viscosity such as various liquids, gases, or mixtures of liquids and gases.

Fluid mixing is required for many applications, such as in the chemical and petrochemical industries, foam producing for fire fighting, cleaning, bathing or the like, and aerated beverage production.

Fluid mixing systems may use pumps to achieve sufficient pressure for the particular application. For example, dog or other animal bathing systems must produce a foaming or soapy water output at sufficient pressure to penetrate matted hair and bring the detergent and water mixture to the skin surface. Sufficient agitation and lather is needed in order to cleanse the animal thoroughly. Other systems have utilized water line pressure and required driven devices for mixing the shampoo, water, de-fleaing agent or other chemicals. Such systems often have insufficient water pressure for agitation to produce complete cleansing.

Other fluid mixing devices have been proposed in the past which use venturi passages to draw fluids into a main fluid stream by suction or vacuum creation. For example, U.S. Pat. Nos. 3,822,217 and 3,853,784 of Rogers describe a foam-forming device in which a detergent inlet is provided at a smaller diameter portion of a venturi passage through which water is flowing. Detergent is injected in a thin jet into the passage, and mixes with the water. The mixture flows at higher velocity through the expanding portion of the venturi passage to produce a thorough mixing. Air is injected at a spaced location downstream of the detergent inlet.

In U.S. Pat. No. 2,800,313 of Targosh et al., a liquid mixing nozzle is described in which two diametrically opposite venturi passages are provided. A first inlet from a source of detergent is provided into one venturi passage, and an air inlet is provided into the other passage downstream of the detergent inlet. An air inlet opening is also provided into the first inlet, and this may be closed or partially closed by hand in order to vary suction drawing detergent into the passage.

It has been found that, when two fluid inlets for different viscosity fluids, which may be liquids and/or gases, are provided into the same venturi passage, back pressure from the lower viscosity fluid inlet can affect the amount of higher viscosity fluid drawn into the passage, even if the lower viscosity fluid inlet is downstream of the other inlet.

SUMMARY OF THE INVENTION

It is an object of the present invention to provide a new and improved device and method for mixing fluids of varying viscosities.

According to one aspect of the present invention, a fluid mixing device is provided which comprises an inlet passageway for connection to a first fluid supply, an outlet passageway, separate first and second venturi passageways each connected between the inlet and outlet passageways, each venturi passageway having a reduced area throat portion, a first venturi inlet for connection to a supply of a second fluid connected to the first venturi passageway and a second venturi inlet for connection to a supply of a third fluid connected to the second venturi passageway at the reduced area throat portion, whereby the second and third fluids are drawn into the first fluid flowing separately in the first and second venturi passageways, the outlet passageway being spaced a predetermined distance downstream of the venturi inlets to prevent substantial backflow of the lower viscosity fluid into the higher viscosity fluid passageway prior to mixing together of the two streams in the outlet passageway.

The length of each separate venturi passageway from the respective venturi inlet to the outlet passageway where the two flows mix together is critical, particularly where the second and third fluids, which are to be separately mixed into the first fluid or main flow, are of different viscosities. For example, consider the case where the second fluid is of lower viscosity than the first fluid. If the length of the venturi passageway, or distance of the outlet passageway from the venturi inlet, is too short, the lower viscosity fluid in the first venturi passageway may tend to be sucked back into the higher viscosity fluid in the second venturi passageway, thereby obstructing and interfering with creation of the vacuum and suction drawing the higher viscosity fluid into the second venturi passageway. This backflow or bleedover from one venturi passageway to the other will prevent proper drawing and mixing of the higher viscosity fluid into the main flow of the first fluid, and thus prevent the desired mixing proportions. Thus, the distance of the outlet passageway from the venturi inlets is predetermined to avoid any substantial backflow or bleedover.

In a preferred embodiment of the invention, a single venturi tube is provided with a septum or baffle dividing the tube into the separate first and second venturi passageways extending along at least part of the length of the tube. Preferably, an inwardly tapering inlet portion leads to the inlet ends of the two venturi passageways, and an outwardly tapering portion leads from each reduced area throat portion to the outlet passageway. Separate fluid inlets for connection to different fluids may be provided. In one example, where the device is used to produce foam, the inlet passageway may be connected to a water supply while the first and second venturi inlets are connected to supplies of air or oxygen and detergent or foaming agent, respectively. The second venturi inlet may be selectively connected to a plurality of different liquids and the liquid inlets are connected to the second detergent inlet via a multi-way valve so that different liquids may be mixed with the water. One of the liquid inlets may be connected to a container of detergent or shampoo, while the other inlets may be connected to containers of other liquids, such as conditioner and de-fleaing or insecticide agent, where the device is used for animal bathing purposes. If more fluids are to be mixed, the venturi tube may be divided into three or more separate passageways via a suitably shaped baffle.

The length of the baffle or septum from the venturi inlets to the outlet passageway at the end of the septum is selected based on minimizing backflow from the venturi passageway connected to the lowest viscosity liquid into the other venturi passageway. This will be dependent on flow conditions, size of the venturi passageways, and the actual viscosities of the fluids to be mixed, which may be liquids, gases, or both liquids and gases. In one preferred embodiment of the invention, the fluid mixing device is designed for producing a foam output, for example for cleaning or bathing purposes, or for firefighting or the like. Where the apparatus is used to create a foam, the length of the baffle is also critical for another reason.

If the baffle length beyond the venturi inlets is too long, bubbles forming in the water as the air or other gas is drawn in will tend to coalesce, leading to an undesirably large bubble size in the foam. Thus, in this particular application where air or other gas is mixed with water an detergent, the baffle length is selected so as to minimize backflow of air or gas or other lower viscous fluid, while also minimizing bubble coalescence prior to the foam outlet. It has been found that, for a venturi passageway of cross-sectional area 0.0051 sq. in. ($3.3\times10^{-9}$ m$^2$), the length of the passageway from the respective inlet to the downstream end of the septum or baffle must be greater than 0.8 inches ($2.03\times10^{-2}$ m), and preferably no less than 1.0 inches ($2.54\times10^{-2}$ m). Preferably, the length of the septum from the gas or liquid inlet is in the range from 1.0 inches to 2.0 inches ($2.54\times10^{-2}$ to $3.08\times10^{-2}$ m). The ratio of the septum length to the venturi cross sectional area is preferably in the range from 156 in/in$^2$ (6180 m/m$^2$) to 197 in/in$^2$ (7880 m/m$^2$). This has been found to produce minimal backflow and an optimum foam output when using a shampoo with a viscosity of the order of 3,000 to 4,000 Centipoise (300 to 400 Kgm$^{-1}$s$^{-1}$) and a water inlet pressure in the range from 37 to 80 psi ($255\times10^3$ to $551\times10^3$ Pa).

The outlet passageway is preferably connected to a suitable spray hose and nozzle of the spray head type, with sufficient overall hose diameter and hose length along with the outlet orifice area to cause very little flow restriction or back pressure on the venturi while providing a sufficiently pressurized spray. Preferably, the total outlet cross sectional area at the spray head is at least 0.1 sq. inches.

Preferably, the gas inlet is connected to atmospheric air, which is drawn into the venturi passageway by suction. However, it may alternatively be connected to a pure oxygen supply. This can be helpful for wound healing purposes if the device is used for animal bathing purposes.

According to another aspect of the present invention, a method of producing a fluid mixture is provided, which comprises the steps of:

connecting a first end of an inlet passageway to a source of a first fluid;

connecting a second end of the inlet passageway to separate first and second venturi passageways each having an inlet and an outlet end spaced a predetermined distance from the inlet;

connecting the first inlet in the first venturi passageway to a supply of a second fluid, whereby the second fluid is drawn into and mixed with the first fluid flowing along the first venturi passageway;

connecting the second inlet in the second venturi passageway to a supply of a third fluid so that the third fluid is drawn into and mixed with the first fluid flowing along the second venturi passageway; and connecting the outlet ends of the separate venturi passageways to a single outlet passageway where the first and second fluid mixture is mixed with the first and third fluid mixture to produce an output mixture of the three fluids;

whereby the second fluid is of lower viscosity than the third fluid and the predetermined distance from each venturi passageway inlet to the outlet passageway is such that substantially no backflow of the second fluid into the second venturi passageway is produced.

It is very important that backflow into the second venturi passageway is avoided, since this would result in insufficient or variable vacuum or suction, and thus insufficient quantity of the third fluid being drawn into the second passageway. In one specific example where the device is used to mix water, gas, and detergent, it has been found that the length from each venturi inlet to the outlet passageway where the mixtures combine into one should be no less than 0.8 inches ($2.03\times10^{-2}$ m), and is preferably 1 inch ($2.54\times10^{-2}$ m)or more, where the venturi passageways have a cross sectional area of the order of 0.0051 in$^2$ ($3.3\times10^{-9}$ m$^2$). The length should also not exceed around 2 inches ($5.08\times10^{-2}$ m), so that air or gas bubbles forming in the first venturi passageway do not have time to coalesce significantly before mixing with the detergent and water at the outlet passageway. This produces an optimum foam output which is particularly suitable for animal bathing purposes.

Most commercially available shampoos will be too viscous for use in most mixing valves. Because of the improved foaming action produced by the mixing device and method of this invention, a less viscous shampoo can be used while still producing a soapy foam which will produce efficient cleaning. The mixing of a detergent and water mixture with an air and water mixture produces an improved foam with both detergent and air bubbles, with the air bubbles producing increased agitation to loosen dirt. This is particularly advantageous in animal bathing, where the air bubbles both massage the animal's skin to loosen dirt, improving cleansing, and also have a healing effect on rashes, abrasions, wounds, or the like, due to the oxygen applied to the animal's skin. This may also provide a therapeutic effect in humans. The air may be replaced by pure oxygen if desired for improved healing purposes.

Although one specific application of the fluid mixing device and method of this invention is for mixing air or other gas and a detergent into a water supply in order to produce a foamed output mixture, the device and method of this application has wide applicability in many fields where mixing of three or more fluids is required, where the fluids are liquids, gases, or mixtures of both liquids and gases. For example, it may be used to produce foam for fire fighting applications, or to produce non-foamed output mixtures of fluids in the chemical or petrochemical industries, or in aerated beverage production. In each case, it has advantages over prior art mixing valves since it achieves venturi mixing by suction in two or more separate venturi passageways, preferably formed by dividing a single venturi passage by means of a suitably shaped baffle or septum. At the same time, by precise selection of the distance from the venturi passageway inlets to the outlet end of the septum, backflow of a lower viscosity liquid into the higher viscosity liquid passageway can be avoided or minimized.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which:

FIG. 13 is a perspective view of a mixing unit according to another embodiment of the invention which also has an adjustable septum;

FIG. 14 is a side elevational view of a fluid mixing unit according to another embodiment of the invention;

FIG. 15 is an enlarged sectional view of the venturi portion of the unit of FIG. 14; and FIG. 16 is a section on the lines 16—16 of FIG. 15.

DESCRIPTION OF THE PREFERRED EMBODIMENT

Figure 5:
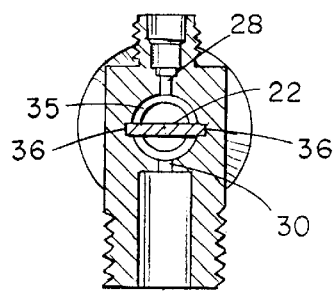
FIG. 5 is a sectional view taken on line 5—5 of FIG. 2.
Figure 6:
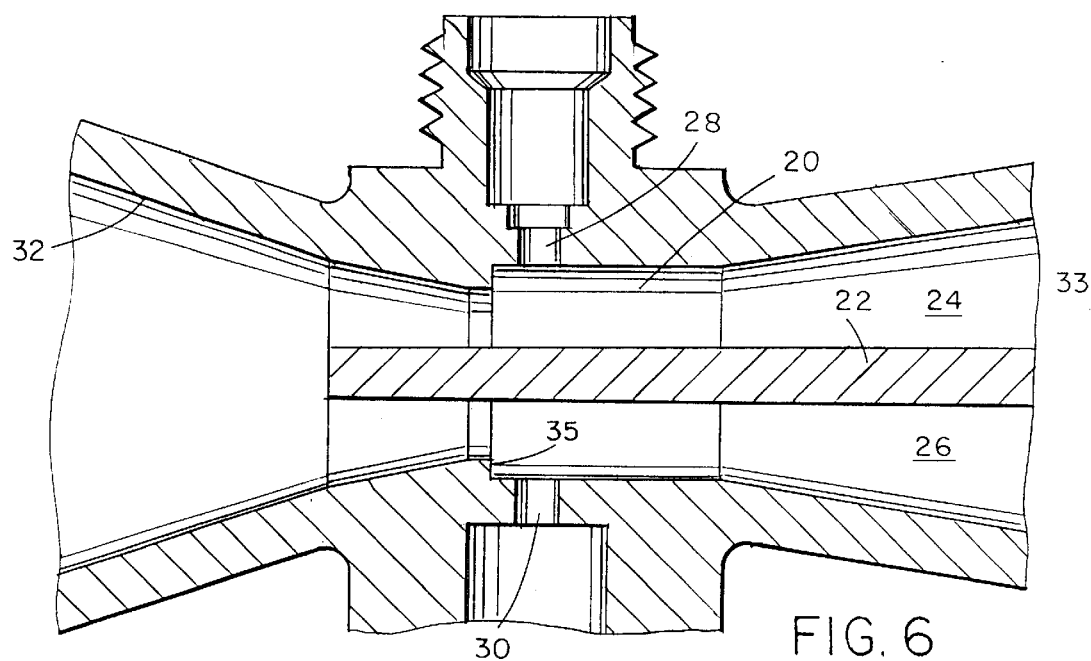
FIG. 6 is an enlargement of the central portion of FIG. 2.
Figure 7:
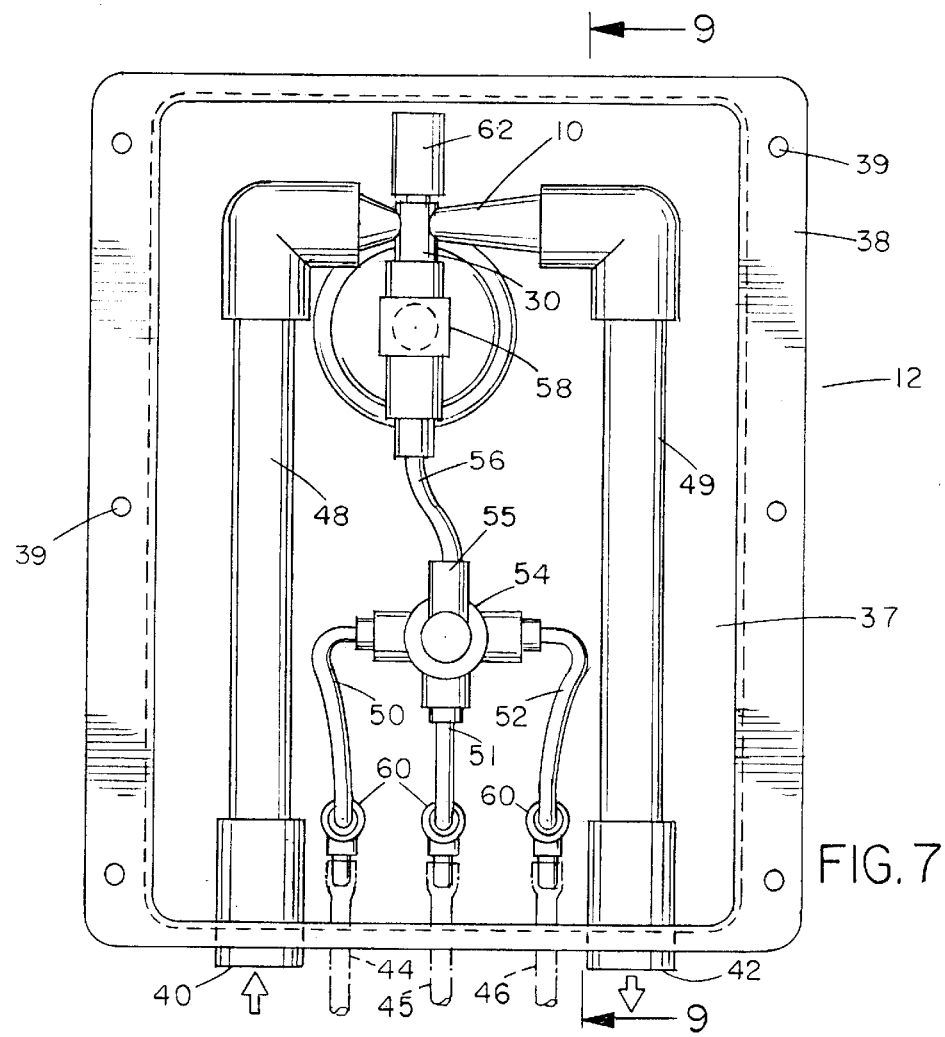
FIG. 7 is a rear view of a foam dispensing system incorporating the mixing unit of FIGS. 1 to 6.
Figure 9:
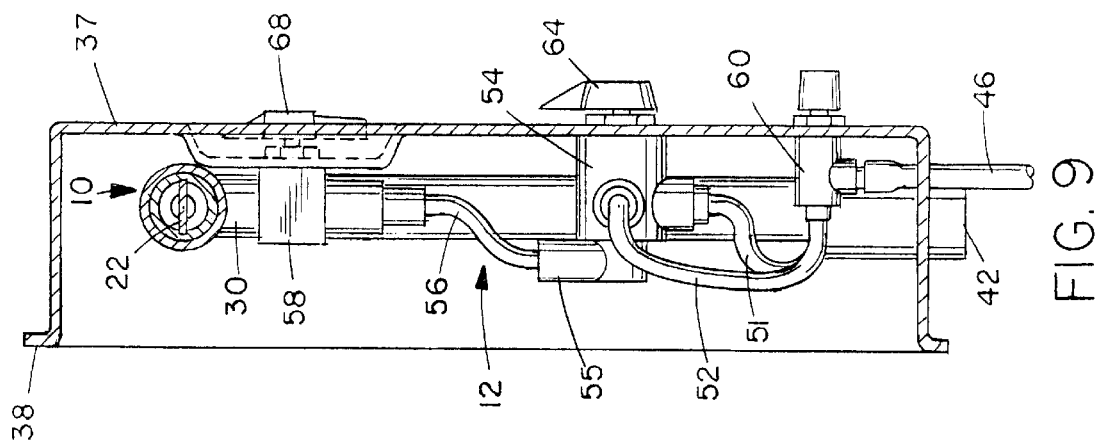
FIG. 9 is a sectional view taken on line 9—9 of FIG. 7.
Figure 8:
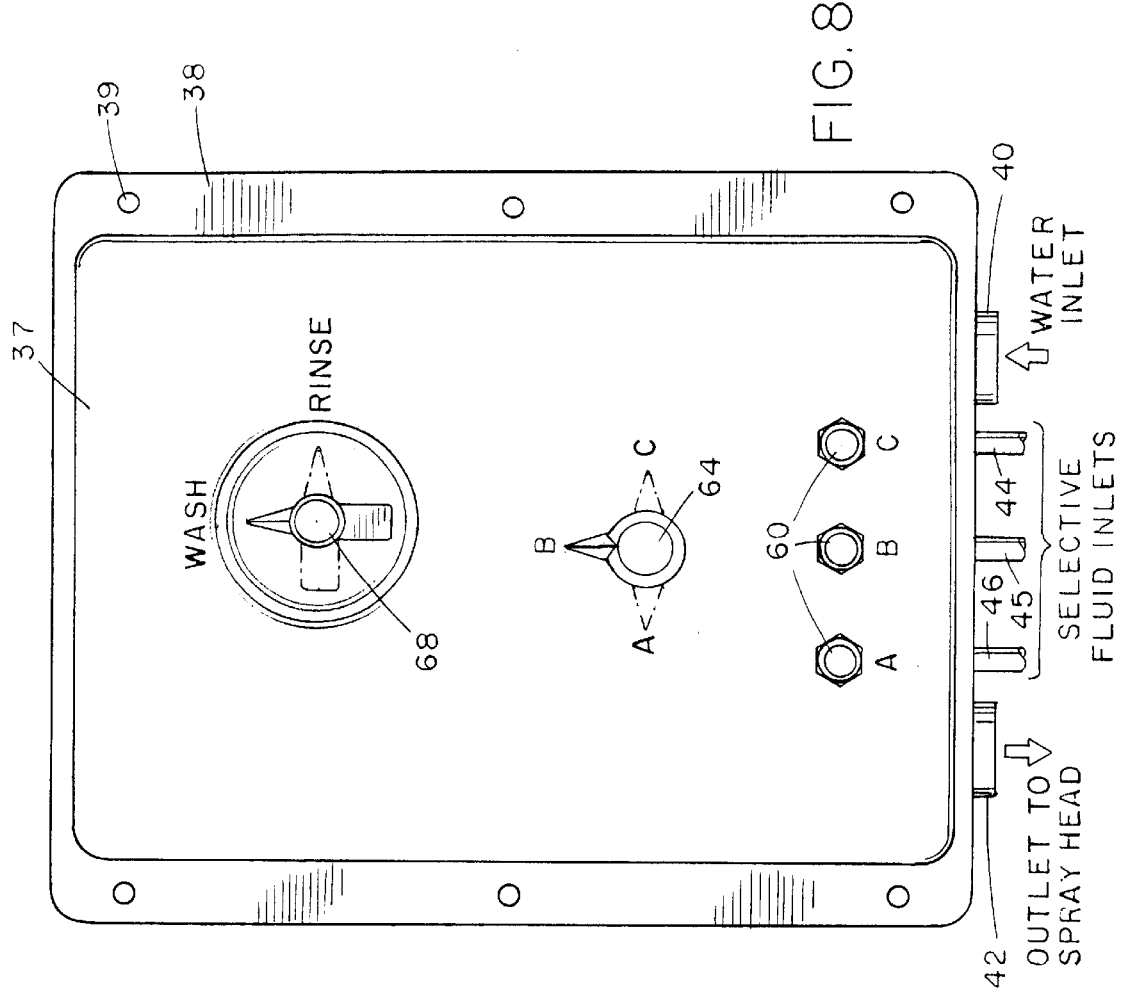
FIG. 8 is a front view of the dispensing system housing.

FIGS. 1 to 6 of the drawings illustrate a fluid mixing device or unit 10 according to a first embodiment of the invention, while FIGS. 7 to 9 illustrate the device 10 installed in a foam dispensing apparatus 12. Although the apparatus as described in the preferred embodiment is intended for dispensing a foamed mixture of water, detergent, and air for cleaning purposes, it will be understood that the device of this invention may also be used in other applications requiring foamed outputs, such as firefighting, and any application requiring mixing of two or more fluids into a primary fluid stream with or without a foamed output, for example in the chemical or petrochemical industry, or beverage industry.

Unit 10 basically comprises a venturi tube 14 having an enlarged inlet end 16, an enlarged outlet end 18, and a reduced area throat portion or venturi 20. A septum or baffle 22 separates the tube 14 into two generally semi-cylindrical passageways 24,26 on opposite sides of the septum. Septum 22 extends from the outlet end 18 of the tube past the venturi or throat portion 20. Aligned, diametrically opposed inlets 28,30 extend into the respective passageways 24,26 at the throat portion 20 of the tube.

Tube 14 has a first inlet portion 31 of uniform diameter, and an inwardly tapered or conical portion 32 leading from the inlet portion up to the throat portion 20. An outwardly tapered portion 33 leads from throat portion 20 up to an outlet portion 34 of uniform diameter. The inlet end 16 of the tube is designed to be connected to a mains water supply via a hose or the like, while the outlet end is suitably connected to a spray nozzle or the like.

The inlets 28 and 30 are threaded for connection to pipe or hose end connectors for supply of selected fluids to the venturi. In the preferred embodiment of the invention, the fluid mixing device is used to produce a foam output for use in animal bathing or the like, although it may be used in any other application where foam production is desired, such as fire fighting equipment, car washing equipment, or the like. The first inlet 28 is designed to be connected to an air or oxygen supply, while the second inlet 30 is connected to a supply of detergent, shampoo, or the like. The supplies to inlets 28 and 30 are preferably not under pressure.

The shape of the venturi throat portion 20 is best illustrated in FIG. 6. A step 35 is provided between the end of tapered portion 32 and the venturi throat portion 22. This will produce a reduction in water pressure and thus increased velocity as the water is forced into a lower pressure region 20, creating suction to draw fluid in via inlets 28 and 30.

Figure 1:
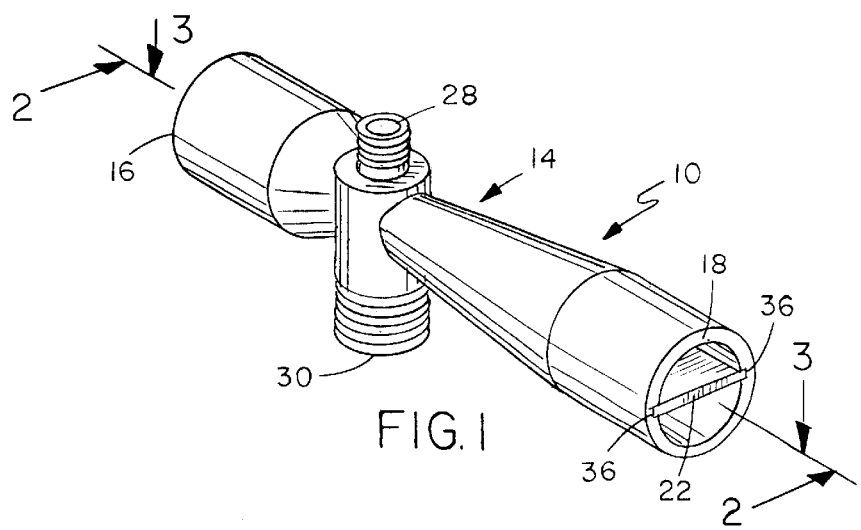
FIG. 1 is a perspective view of a fluid mixing unit according to a first embodiment of the invention.
Figure 3:
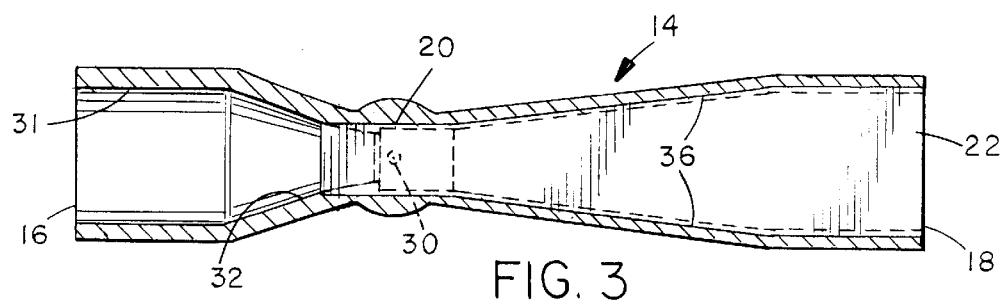
FIG. 3 is an enlarged sectional view taken on line 3—3 of FIG. 1.
Figure 4:
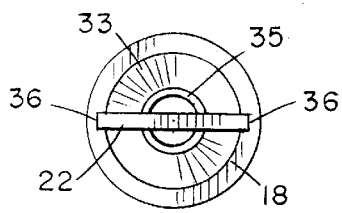
FIG. 4 is a right-hand end view of the mixing unit.

In the illustrated embodiment, the septum or baffle 22 is shown as being formed separately from the venturi tube 10 and comprises a flat plate with inwardly tapering sides, as best illustrated in FIG. 3. The septum or plate 22 engages in diametrically opposed grooves 36 extending from the outlet end of the venturi tube, as best illustrated in FIGS. 1,3, and 5, and may secured in position by a suitable adhesive. The septum 22 terminates just past the venturi throat 20, and prior to the enlarged inlet region, so that it can be readily inserted from one end of the venturi. This provides easy and inexpensive manufacture. However, the venturi tube and septum may alternatively be molded together in two halves which are then adhered together. It will be understood that the septum may also be formed integrally with the tube in any suitable manner, for example by machining, molding, or the like. All of these alternatives will produce substantially the same effect, although the illustrated embodiment is believed to be the simplest and most inexpensive structure.

It has been found that the technique of dividing a single, cylindrical venturi tube into two halves of generally D-shaped cross-section has substantial advantages over two separate, cylindrical venturi tubes, and requires much less water for proper operation. It is known that, for a conventional cylindrical Venturi, the size of the step or enlargement 35 is critical for producing the required suction. If it is too large or too small, suction will be insufficient. If two separate venturi's were provided, the size of the venturi step would need to be decreased, requiring more water flow for proper operation. By dividing a single venturi passageway into two separate, D-shaped halves, the size of the step can remain the same and no additional water flow is required for optimum suction. If more than two fluids are to be mixed into the water, tube 14 may be divided into three separate venturi passages by means of a y-shaped septum, or into four separate venturi passages via an x-shaped septum, for example.

FIGS. 7 to 9 illustrate one possible application for the mixing device 10 of the FIGS. 1 to 6, in a foam dispensing apparatus or bathing system 12. An outer housing 37 has a back plate or rim 38 with holes 39 for wall mounting purposes. A first, water inlet 40 is provided for connection to a mains water supply, and an outlet 42 from the housing is adapted for connection via a flexible hose or the like to an outlet spray head or nozzle (not illustrated). A plurality of separate fluid inlets 44,45,46 are provided for connection to different liquids, such as a shampoo, de-fleaing agent, and conditioner. The liquids may be provided in bottles or other containers, with the various tubular inlets extending into the respective bottles.

Inside the housing, a connecting manifold connects each of the inlets and the outlet to the fluid mixing unit 10. A first pipe or tube 48 connects water inlet 40 to the inlet end 16 of unit 10. A second tube 49 connects the outlet end 18 of unit 10 to the spray outlet 42. The three inlets 44,45,46 are connected via hoses 50,51,52, respectively, to a three-way selector valve 54. An outlet 55 of valve 54 is connected via tube 56 and an on-off valve 58 to the inlet 30 of unit 10. Needle valves 60 may be provided between each inlet 44,45,46 and the respective hose 50,51,52 for fine adjustment of the amount of solution supplied to the unit 10. An air inlet and filter 62 is connected to the inlet 28 of the mixing unit 10.

Figure 2:
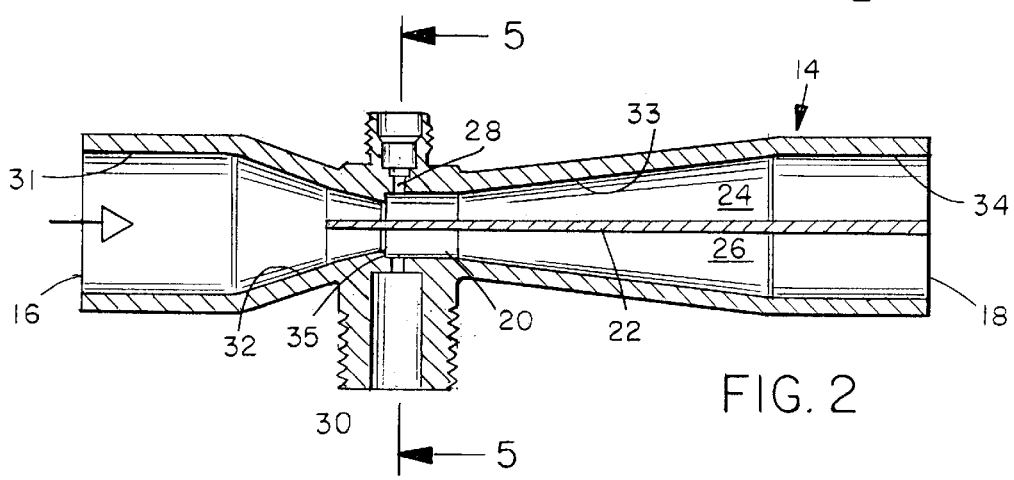
FIG. 2 is an enlarged sectional view taken on line 2—2 of FIG. 1.

In operation, water is supplied to inlet 40 and flows through the unit 10 in the direction of the arrow in FIG. 2. The lower pressure at the constricted throat portion 20 of each venturi passageway after step 35 will increase velocity of the water flowing through it, and also create suction to draw air into passageway 24 and to draw the selected liquid into passageway 26. Each of the liquid inputs 44,45,46 will be connected via a suitable hose or pipe (not illustrated) to a supply of a respective liquid in a container such as a bottle or the like. Needle valve 60 is adjusted to control the amount of liquid dispensed, while selector valve 54 is adjusted via control knob 64 to select which of the three fluids A,B or C is dispensed. The fluids may be liquids or gases. As noted above, one of the liquids is typically a shampoo or soap solution, while the others may be a conditioner and a de-fleaing or insecticide agent, when the apparatus is used for animal bathing purposes.

Assuming that detergent or shampoo is selected first, the water will be mixed with shampoo at inlet 30, and the separate stream of water will be mixed with air at inlet 28, forming air bubbles and soap bubbles in the separate streams. The two streams will mix together after the outlet end of venturi tube 10, in the connecting tube 49, and a foamed output will be dispensed at outlet 42. The length I of the septum 22 from the venturi step 35 adjacent the inlets 28,30 up to the downstream end 65 of the septum, i.e. the point where the separate venturi passageways merge into one, is critical in order to avoid any substantial backflow of air and also to reduce bubble coalescence.

If the area of each venturi passage 24,26 at the venturi throat 20 is A, then the ratio I/A (length of septum from venturi step to downstream end, divided by cross-sectional area of one side of venturi) is preferably greater than 156 in/in$^2$ (6180 m/m$^2$), and preferably equal to or greater than 196 in/in$^2$ (7880 m/m$^2$). Where the cross-sectional area of each venturi passageway at the venturi throat 20 is around 0.0051 in$^2$ (3.3×10$^{-9}$ m$^2$), the length I of the septum past the venturi step is preferably at least 0.8 inches (2.03×10$^{-2}$ m), and preferably 1.0 inches (2.54×10$^{-2}$ m) for optimum results. The septum length I may be in the range from 0.8 to 2.0 inches (2.03×10$^{-2}$ to 5.08×10$^{-2}$ m), but is preferably around 1.0 inches (2.54×10$^{-2}$ m). If the length of the septum was too short, back pressure of air into the venturi passageway 26 would occur, and this would reduce the amount of detergent sucked in through inlet 30. The minimum septum length at which the venturi performed properly to produce an output foam was just greater than 0.8 inches (2.03×10$^{-2}$ m) for the venturi area given above. The septum length beyond the venturi step should also not be too great, since air bubbles formed in passageway 24 will tend to coalesce and become larger, and smaller air bubbles are preferable for optimum agitation purposes. Thus, the length of the septum is preferably about 1.0 inches (2.54×10$^{-2}$ m) to provide the best compromise between minimizing back flow of air into the other venturi passageway, and avoiding excessive coalescing of air bubbles prior to mixing with the detergent/water mixture. The size or height of venturi step 35 is preferably of the order of 0.057" (0.145×10$^{-2}$ m). The angle of the tapered portion 33 downstream of the venturi is preferably approximately 8°, in order to shorten the overall venturi length. As this angle increases, the required septum length will increase.

Where the venturi mixing device of this invention is used to mix two or more secondary fluids into a primary fluid which is water, it is preferably operated at a water supply pressure above around 20 psi (137.9×10$^3$ Pa), although it will work at lower pressures. The bathing system of FIGS. 7 to 9 is designed for operation at mains water supply pressures in the range from 37 to 80 psi (255×10$^3$ to 551×10$^3$ Pa). Both the air or gas input and the detergent or other liquid input are unpressurized, and are drawn into the respective venturi passageways by suction produced by the high speed water flow across the venturi inlets. The suction is sufficient to draw in even relatively high viscosity liquids of 10,000 Centipoise (1,000 Kgm$^{-1}$s$^{-1}$) or more, but the preferred viscosity range for the liquid is in the range from 100 to 4,000 Centipoise (10 to 400 Kgm$^{-1}$s$^{-1}$).

The output at outlet 42 will therefore be a mixture of water, detergent, and air bubbles, which is supplied via a suitable spray head similar to a conventional shower head as a cleansing foam. This may be sprayed onto anything which requires cleaning. However, the system is particularly intended for animal or human bathing purposes. In an animal bathing application, the foam is applied against the animal's body, and will agitate and remove dirt, as well as producing a healing effect as a result of the air or oxygen applied to the skin.

Once the animal has been washed sufficiently, the detergent supply may be turned off, and a conditioner or de-fleaing agent may be applied by suitable selection at selector valve 54. After conditioning and/or de-fleaing the animal, the on off valve 58 may be turned to the off position via control knob 68, so that air and water only are applied to the animal's coat. This therefore provides an extremely convenient animal bathing system. The liquids connected at inlets 44,45, and 46 may be varied as desired.

FIGS. 1 to 6 illustrate a fluid mixing device 10 in which two fluids, which may be liquids or gases, or a liquid and a gas, are mixed into a primary fluid stream, which also may be a liquid or a gas but which is water in the application illustrated in FIGS. 7 to 9, in separate venturi passageways which are of the same dimensions. However, the sizes of the two venturi passageways may be different in some cases, depending on the mixing proportions required, or the secondary fluid inlet cross-sections may be different. Also, instead of two venturi passageways, there may be three or more, depending on the number of fluids to be mixed into the primary fluid stream. FIGS. 10 to 16 illustrate some alternative embodiments which allow a greater number of fluids to be mixed or allow the mixing proportions to be readily adjusted.

Figure 10:
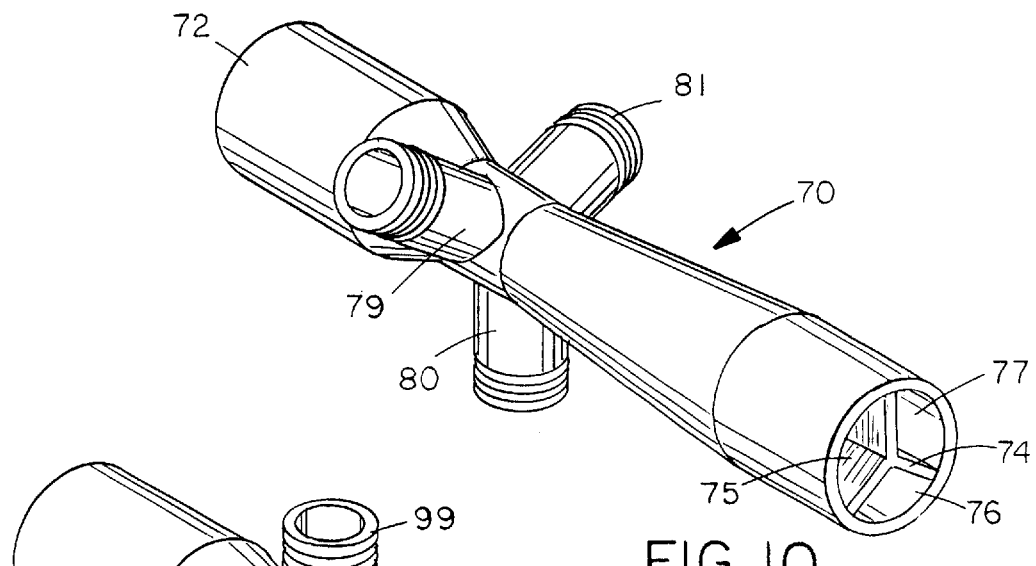
FIG. 10 is a perspective view of a modified mixing unit for mixing three fluids into a primary fluid.

FIG. 10 illustrates a venturi unit 70 in which three fluids are mixed into a primary fluid stream flowing along a venturi tube 72 of similar shape and dimensions to the venturi tube 14 of FIGS. 1 to 4. It will be understood that the fluids may be liquids, gases, or both liquids and gases. A y-shaped septum or baffle 74 separates the tube into three separate venturi passageways 75,76,77 and extends along the tube from a position downstream of the venturi throat portion 78 up to the outlet end of the tube. A series of three circumferentially spaced inlets 79,80,81 extend into the respective passageways 75,76,77 at the venturi throat portion, for supplying selected fluids to the passageways for mixing into the primary fluid. The unit 70 of FIG. 10 is otherwise identical to that of FIGS. 1 to 4. Although the legs of the y-shaped baffle are symmetrically arranged with the same angle between each adjacent pair of legs, they may be arranged non-symmetrically in alternative embodiments, to provide venturi passageways of different sizes to provide different mixing proportions.

Figure 11:
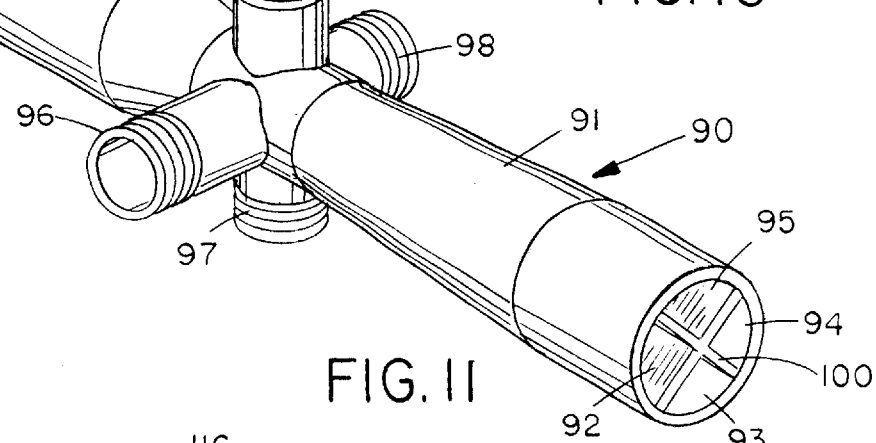
FIG. 11 is a perspective view of a modified mixing unit for mixing four fluids into a primary fluid.

FIG. 11 illustrates another alternative venturi unit 90 in which the main venturi tube 91 is split into four separate venturi passageways 92,93,94,95 having spaced inlets 96,97,98,99, respectively at the venturi throat. The passageways are formed by means of an x-shaped or cross-shaped baffle or septum 100. Although the passageways are of equal cross-sectional dimensions in the illustrated embodiment, the relative dimensions may be varied simply by varying the angles between the adjacent legs of the x-shaped baffle 100. In each of FIGS. 10 and 11, the various secondary fluid inlet sizes may also be different from one another if desired, and the nozzle dimensions at the inlet end of each venturi passageway may also be different from that of the other passageways, depending on mixing requirements.

Figure 12:
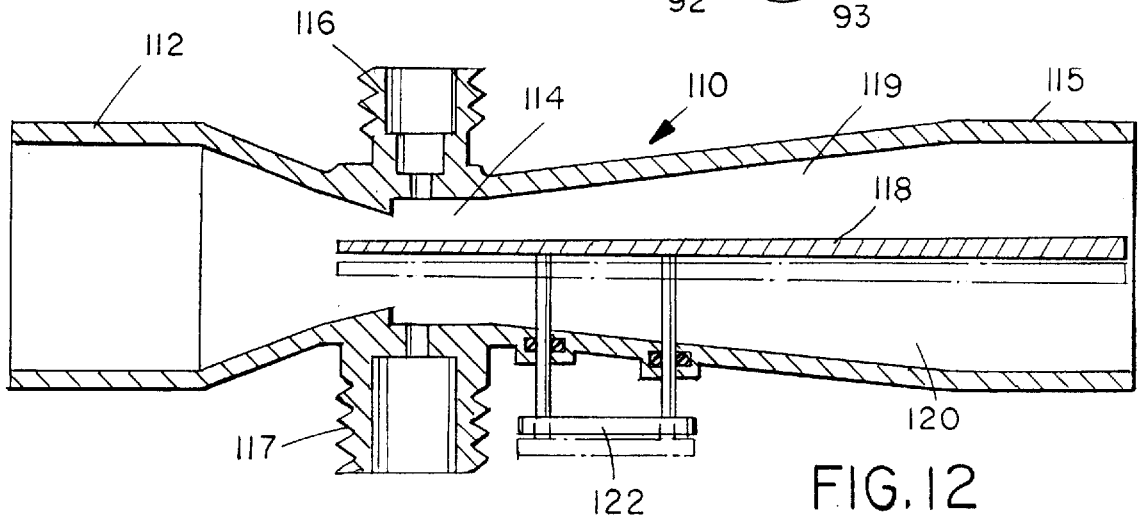
FIG. 12 is an enlarged sectional view similar to FIG. 2 illustrating a modified mixing unit with an adjustable septum.

FIGS. 12 to 16 illustrate various alternative arrangements permitting adjustment of the passageway or nozzle cross-section. In FIG. 12, a main venturi tube 110 has an inlet end portion 112 and throat portion 114 of similar shape to that of FIGS. 1 to 4, and an outlet end portion 115 of square, rather than cylindrical, shape. A pair of diametrically opposed inlets 116,117 are arranged at the venturi throat, as in FIGS. 1 to 4. A slidably mounted baffle 118 in the tube divides the tube into two separate venturi passageways 119,120. A handle 122 or any other suitable actuating device is provided for moving the baffle 118 to any selected position, depending on the desired proportions of fluids to be supplied into passageway 119,120 via inlets 116,117, respectively. A suitable sliding seal will be provided between the outer side edges of baffle 118 and the opposing side walls against which it slides.

FIG. 13 illustrates a mixing device 130 according to another embodiment of the invention which has an alternative mechanism for varying the relative sizes of two venturi passageways. Mixing device 130 comprises a main venturi tube 132 having an inlet portion 134, a venturi throat portion 135 of reduced size, and an outlet portion 136. The throat and outlet portions are divided into two separate venturi passageways 138,139 by means of a pivotally mounted baffle 140. In this embodiment, the baffle 140 is pivotally mounted along one side edge via a pivot axle 142 extending along the venturi tube. However, it may alternatively be pivoted at one end, via a suitable pivot mounting at the venturi throat or outlet end of the tube. Inlets 144, 145 are provided for supply of fluid into the respective passageways 138,139 at the venturi throat.

FIGS. 14 to 16 illustrate a mixing device 150 according to an alternative embodiment in which the nozzle area leading into each venturi passageway can be adjusted. The mixing device 150 comprises a main venturi tube 152 having an inlet portion 154, a venturi throat portion 155, and an outlet portion 156. As in the embodiment of FIGS. 1 to 4, a fixed baffle 158 divides the throat and outlet portions 155,156 of the tube into two separate venturi passageways 159,160, and opposing inlets 162,164 are provided into the passageways 159,160, respectively, at the venturi throat. A nozzle adjustment member 166 is rotatably mounted in the tube 152 adjacent the inlet ends of the passageways. Member 166 is generally ring shaped and has a tapered through bore 168 which has a central axis offset from the central axis of tube 152. A slot 170 is provided in the tube 152 aligned with the member 166, and a toggle handle 172 projects out of slot 170 for manual rotation of member 166 to adjust the inlet nozzle sizes of the two passageways. O-ring seals 174 are provided between the member 166 and slot 170 to prevent leakage of fluid from the tube 152. By rotating member 166 relative to the tube 152, the relative sizes of the inlet nozzles into each of the passageways can be varied easily, thus adjusting the mixing proportions as desired.

The fluid mixing device of this invention allows two or more fluids to be mixed readily into a primary fluid flowing along a main venturi tube by supplying the fluids to separate venturi passageways formed by splitting the tube into two or more passageways via a suitably shaped baffle. The secondary fluids are supplied via separate inlets at a throat portion of the tube adjacent a venturi step, such that suction or vacuum is created by the main fluid flowing along the passageways, drawing each secondary fluid into the respective passageway. The device allows even relatively viscous fluids to be readily mixed into a main fluid of any viscosity.

Although some preferred embodiments of the invention have been described above by way of example only, it will be understood by those skilled in the field that modifications may be made to the disclosed embodiments without departing from the scope of the invention, which is defined by the appended claims.

We claim:

1. A fluid mixing device, comprising:
   an inlet passageway for connection to a primary fluid supply;
   an outlet passageway;
   at least two separate venturi passageways each connected between the inlet and outlet passageways, each venturi passageway having a reduced diameter throat portion, a first venturi inlet connected to the throat portion of a first venturi passageway and a second venturi inlet connected to the throat portion of a second venturi passageway, whereby fluids are drawn into primary fluid streams flowing separately in the first and second venturi passageways;
   the outlet passageway being spaced a predetermined distance downstream of the venturi inlets to prevent substantial backflow of one of the secondary fluids from one venturi passageway to the other passageway prior to mixing together of the two streams in the outlet passageway; and
   at least the inlet passageway and venturi passageways comprising a single venturi tube and a septum extending along at least part of the length of the tube and dividing the tube into at least two venturi passageways of non-circular cross-section each having at least one flat wall formed by the septum.

2. The device as claimed in claim 1, wherein each venturi passageway is of generally D-shaped cross-section.

3. The device as claimed in claim 1, wherein the septum is a flat planar member.

4. The device as claimed in claim 1, wherein the septum is a y-shaped member and divides the tube into three separate venturi passageways.

5. The device as claimed in claim 1, wherein the septum is an x-shaped member and divides the tube into four separate venturi passageways.

6. The device as claimed in claim 1, wherein the septum is movably mounted in the tube for varying the size of the respective passageways.

7. The device as claimed in claim 1, including an adjustment nozzle rotatably mounted in the tube adjacent the throat portion for forming inlet nozzles to the respective venturi tubes, the nozzle having a tapered through bore and a central axis offset from the central axis of the venturi tube, whereby rotation of the adjustment nozzle about said central axis varies the size of the respective inlet nozzles.

8. A fluid mixing device, comprising:
   an inlet passageway for connection to a primary fluid supply;
   an outlet passageway;
   at least two separate venturi passageways each connected between the inlet and outlet passageways, each venturi passageway having a reduced diameter throat portion, a first venturi inlet connected to the throat portion of a first venturi passageway and a second venturi inlet connected to the throat portion of a second venturi passageway, whereby fluids are drawn into primary fluid streams flowing separately in the first and second venturi passageways;

the outlet passageway being spaced a predetermined distance downstream of the venturi inlets to prevent substantial backflow of one of the secondary fluids from one venturi passageway to the other passageway prior to mixing together of the two streams in the outlet passageway;

at least the inlet passageway and venturi passageways comprising a single venturi tube and a septum extending along at least part of the length of the tube and dividing the tube into at least two venturi passageways; and the venturi tube having an inlet end and an outlet end, the septum terminating short of the inlet end, and the inlet passageway extending from the inlet end to the septum, the inlet passageway including an inwardly tapering inlet portion extending up to the throat portion.

9. The device as claimed in claim 8, wherein the tube has an outwardly tapering portion leading from each throat portion to the outlet end.

10. The device as claimed in claim 1, wherein the tube has a step in diameter upstream of each venturi inlet, and the venturi inlets are aligned and diametrically opposed adjacent the step.

11. The device as claimed in claim 10, wherein the septum has a predetermined length from the venturi step to the downstream end of the septum.

12. The device as claimed in claim 11, wherein the predetermined length is at least 0.8 inches.

13. The device as claimed in claim 12, wherein the predetermined length is approximately 1.0 inches.

14. The device as claimed in claim 13, wherein the cross-sectional area of each venturi passageway at the venturi inlet is approximately 0.0051 in$^2$.

15. The device as claimed in claim 8, wherein the venturi tube has a pair of diametrically opposed grooves extending from its outlet end at least up to said inlet passageway, and said septum comprises a flat plate formed separately from the venturi tube and having opposite side edges slidably engaged in the respective grooves.

16. A fluid mixing apparatus, comprising:
a first inlet tube for connection to a primary fluid supply;
a second inlet for connection to a first secondary fluid supply;
a third inlet for connection to a second secondary fluid supply;
an outlet tube;
a venturi device having a first, inlet end connected to the inlet tube and a second, outlet end connected to the outlet tube;
the venturi device comprising at least two separate venturi passageways each connected between the inlet and outlet ends of the venturi device, each venturi passageway having a throat portion, a first venturi inlet connected to the throat portion of the first venturi passageway and a second venturi inlet connected to the throat portion of the second venturi passageway, whereby secondary fluids are drawn into the primary fluid flowing separately in the first and second venturi passageways;
the second inlet being connected to the first venturi inlet, and the third inlet being connected to the second venturi inlet;
the outlet end of the venturi device being spaced a predetermined distance downstream of the venturi inlets to prevent substantial backflow of a secondary fluid from one venturi passageway to the other prior to mixing together of the two streams in the outlet passageway; and
each venturi passageway being of substantially D-shaped cross-section.

17. The apparatus as claimed in claim 16, wherein the venturi device comprises a single venturi tube and a septum extending along at least part of the length of the tube and dividing the tube into the separate first and second venturi passageways.

18. The apparatus as claimed in claim 16, wherein each Venturi passageway has a step extending only around the arcuate portion of the D-shape.

19. A fluid mixing apparatus, comprising:
a first inlet tube for connection to a primary fluid supply;
a second inlet for connection to a first secondary fluid supply;
a third inlet for connection to a second secondary fluid supply;
an outlet tube;
a venturi device having a first, inlet end connected to the inlet tube and a second, outlet end connected to the outlet tube;
the venturi device comprising at least two separate venturi passageways each connected between the inlet and outlet ends of the venturi device, each venturi passageway having a throat portion, a first venturi inlet connected to the throat portion of the first venturi passageway and a second venturi inlet connected to the throat portion of the second venturi passageway, whereby secondary fluids are drawn into the primary fluid flowing separately in the first and second venturi passageways;
the second inlet being connected to the first venturi inlet, and the third inlet being connected to the second venturi inlet;
the outlet end of the venturi device being spaced a predetermined distance downstream of the venturi inlets to prevent substantial backflow of a secondary fluid from one venturi passageway to the other prior to mixing together of the two streams in the outlet passageway; and
a plurality of separate third inlets for selective connection to said second venturi inlet, and a valve for controlling connection of any selected one of said third inlets to said second venturi inlet.

20. The apparatus as claimed in claim 19, wherein three separate third inlets are provided, the inlets being connected to supplies of different secondary fluids, and the valve comprises a three-way valve.

21. A fluid mixing apparatus, comprising:
a first inlet tube for connection to a primary fluid supply;
a second inlet for connection to a first secondary fluid supply;
a third inlet for connection to a second secondary fluid supply;
an outlet tube;
a venturi device having a first, inlet end connected to the inlet tube and a second, outlet end connected to the outlet tube;
the venturi device comprising at least two separate venturi passageways each connected between the inlet and outlet ends of the venturi device, each venturi passageway having a throat portion, a first venturi inlet connected to the throat portion of the first venturi passageway and a second venturi inlet connected to the throat portion of the second venturi passageway, whereby secondary fluids are drawn into the primary fluid flowing separately in the first and second venturi passageways;

the second inlet being connected to the first venturi inlet, and the third inlet being connected to the second venturi inlet;

the outlet end of the venturi device being spaced a predetermined distance downstream of the venturi inlets to prevent substantial backflow of a secondary fluid from one venturi passageway to the other prior to mixing together of the two streams in the outlet passageway;

three separate third inlets for selective connection to said second venturi inlet, and a valve for controlling connection of any selected one of said third inlets to said second venturi inlet;

the third inlets being connected to supplies of different secondary fluids, and the valve comprising a three-way valve; and a needle valve for controlling the amount of each secondary fluid supplied to said second venturi inlet.

22. The apparatus as claimed in claim 16, wherein the outlet tube is connected to a spray head, the primary fluid is water, the first secondary fluid is a gas, and the second secondary fluid is detergent, whereby a foam is produced at said spray head.

23. The apparatus as claimed in claim 22, including an on-off valve for selectively cutting off the supply of detergent to said second venturi inlet, whereby a rinse cycle is provided.

24. The apparatus as claimed in claim 22, wherein the length of each separate venturi passageway from the respective venturi inlet to the outlet end where the two flows mix together is at least 0.8 inches.

25. The apparatus as claimed in claim 22, wherein the length is approximately 1.0 inches.

26. The apparatus as claimed in claim 23, wherein the ratio of the length of each venturi passageway from the respective venturi inlet to the outlet to the venturi cross sectional area is in the range from 156 in/in² to 197 in/in².

27. The apparatus as claimed in claim 22, wherein a supply of shampoo is connected to said third inlet, the shampoo having a viscosity in the range of 3,000 to 4,000 Centipoise.

28. The apparatus as claimed in claim 22, wherein the second inlet is connected to an oxygen supply.

29. A method of producing an output mixture of fluids, comprising the steps of:

connecting a first end of an inlet passageway to a source of a primary pressurized fluid;

connecting a second end of the inlet passageway to a single venturi tube divided into separate first and second venturi passageways by a septum extending along at least part of the tube and forming at least one planar wall of each venturi passageway, each venturi passageway having a venturi inlet and an outlet end spaced a predetermined distance from the venturi inlet;

connecting the first venturi inlet in the first venturi passageway to a first secondary fluid supply, whereby a first secondary fluid is drawn into and mixed with the primary fluid flowing along the first venturi passageway;

connecting the second venturi inlet in the second venturi passageway to a second secondary fluid supply so that a second secondary fluid is drawn into and mixed with the primary fluid flowing along the second venturi passageway, the first secondary fluid having a lower viscosity than the second secondary fluid;

connecting the outlet ends of the separate venturi passageways to a single outlet passageway whereby the primary and first secondary fluid mixture is mixed with the primary and second secondary fluid mixture to produce an output mixture; and whereby the predetermined distance from each venturi inlet to the outlet passageway is such that substantially no backflow of the first secondary fluid mixture into the second venturi passageway is produced.

30. The method as claimed in claim 29, including the steps of selectively connecting any one of a series of different fluids to the second venturi inlet.

31. The method as claimed in claim 29, wherein the primary fluid is water, the first secondary fluid is a gas, and the third secondary fluid is a foaming agent, and a foam output is produced at the outlet passageway.

32. The method as claimed in claim 31, wherein a series of different liquids is selectively connected to the second venturi outlet.

33. The method as claimed in claim 32, wherein the different liquids include a de-fleaing agent.

34. The method as claimed in claim 31, including the step of disconnecting the detergent supply from the second venturi inlet at the end of a washing cycle in order to provide a rinse cycle of water and gas only at said outlet passageway.

35. The method as claimed in claim 33, wherein the gas supply comprises atmospheric air.

36. The method as claimed in claim 31, wherein the gas supply comprises pure oxygen.

37. A fluid mixing device for mixing together at least three different fluids, comprising:

a single venturi tube having a first, inlet end for connection to a supply of a first fluid and a second, outlet end;

the venturi tube having a venturi throat portion of reduced diameter spaced between said ends;

a dividing wall separating at least part of said venturi tube extending across said throat portion into at least two separate first and second venturi passageways of non-circular cross-section, the dividing wall having at least two opposing planar surfaces forming flat wall portions of said venturi passageways; and each venturi passageway having an inlet for connection to a supply of a second and third fluid, respectively, for mixing with the first fluid, whereby the second fluid is drawn into the supply of first fluid flowing in the first venturi passageway and the third fluid is drawn into the supply of first fluid flowing in the second venturi passageway, and the first and second fluid mixture is mixed with the first and third fluid mixture at the end of the dividing wall.

* * * * *

UNITED STATES PATENT AND TRADEMARK OFFICE
CERTIFICATE OF CORRECTION

PATENT NO. : 6,293,294 B1
DATED : September 25, 2001
INVENTOR(S) : Loeb, Robert et al.

It is certified that error appears in the above-identified patent and that said Letters Patent is hereby corrected as shown below:

Column 13,
Line 43, change "claim 23" to -- claim 22 --.

Column 14,
Line 37, change "claim 33" to -- claim 31 --.

Signed and Sealed this

Ninth Day of July, 2002

Attest:

Attesting Officer

JAMES E. ROGAN
Director of the United States Patent and Trademark Office